(12) United States Patent  (10) Patent No.: US 7,722,802 B2
Pfeifer et al.  (45) Date of Patent: May 25, 2010

(54) COATED POWDER PARTICLES FOR PRODUCING THREE-DIMENSIONAL BODIES BY MEANS OF A LAYER CONSTITUTING METHOD

(75) Inventors: Rolf Pfeifer, Eislingen (DE); Jialin Shen, Bernstadt (DE)

(73) Assignee: Daimler AG, Stuttgart (DE)

( * ) Notice: Subject to any disclaimer, the term of this patent is extended or adjusted under 35 U.S.C. 154(b) by 984 days.

(21) Appl. No.: 10/545,980

(22) PCT Filed: Feb. 13, 2004

(86) PCT No.: PCT/DE2004/000259

§ 371 (c)(1),
(2), (4) Date: Jul. 14, 2006

(87) PCT Pub. No.: WO2004/073961

PCT Pub. Date: Sep. 2, 2004

(65) Prior Publication Data

US 2006/0251535 A1  Nov. 9, 2006

(30) Foreign Application Priority Data

Feb. 18, 2003 (DE) ................................ 103 06 888

(51) Int. Cl.
  *B22F 7/00* (2006.01)
(52) U.S. Cl. ........................................................ 419/7
(58) Field of Classification Search ........................ None
  See application file for complete search history.

(56) References Cited

U.S. PATENT DOCUMENTS 5,204,055 A * 4/1993 Sachs et al. ..................... 419/2
5,382,308 A * 1/1995 Bourell et al. ............. 156/62.2
5,902,441 A * 5/1999 Bredt et al. .................. 156/284
5,940,674 A * 8/1999 Sachs et al. ..................... 419/2

(Continued)

FOREIGN PATENT DOCUMENTS

DE  43 15 382 A1  12/1993

(Continued)

OTHER PUBLICATIONS

Nelson et al.: "Selective laser sintering of polymer-coated carbide powders," Ind. Eng. Chem. Res., 1995, pp. 1641-1651, vol. 34, No. 5, The Institute of Materials, Washington.

*Primary Examiner*—Melvin C Mayes
*Assistant Examiner*—Stefanie Cohen
(74) *Attorney, Agent, or Firm*—Patent Central LLC; Stephan A. Pendorf

(57) ABSTRACT

The invention relates a powder material consisting of coated particles for a powder-based rapid generative prototyping methods, in particular by compressing a 3D binder. Said powder material consists of individual plastic, metal and/or ceramic particles and/or granules. A coating essentially consists of an adhesive agent which can be activated by a liquid binder, light or laser light, and of sinterable or glass-forming fine-grained material. Said invention also relates to a method for compressing 3D binder with the aid of an organic solvent having a water content less than 45% and to sintered bodies, in particular for moulding or precision mechanical engineering, which are fixed to each other by sintering or glass formation from a fine grained material.

20 Claims, 1 Drawing Sheet

U.S. PATENT DOCUMENTS

| | | | |
|---|---|---|---|
| 6,048,954 A * | 4/2000 | Barlow et al. | 526/328.5 |
| 6,335,052 B1 * | 1/2002 | Suzuki et al. | 428/403 |
| 6,335,097 B1 | 1/2002 | Otsuka et al. | |
| 6,350,495 B1 * | 2/2002 | Schriener et al. | 427/475 |

FOREIGN PATENT DOCUMENTS

| | | |
|---|---|---|
| DE | 690 31 808 T2 | 4/1998 |
| DE | 696 07 975 T2 | 8/2000 |
| DE | 44 40 397 C2 | 4/2001 |
| DE | 689 07 236 T2 | 4/2003 |
| EP | 0 076 781 A2 | 4/1983 |
| EP | 0 369 330 A2 | 5/1990 |
| EP | 0 897 745 A1 | 2/1999 |
| WO | WO9858889 * | 12/1998 |
| WO | WO2001029103 * | 1/2001 |
| WO | WO 01/78969 A2 | 10/2001 |

* cited by examiner

COATED POWDER PARTICLES FOR PRODUCING THREE-DIMENSIONAL BODIES BY MEANS OF A LAYER CONSTITUTING METHOD

CROSS REFERENCE TO RELATED APPLICATION

This application is a national stage of PCT/DE2004/000259 filed Feb. 13, 2004 and based upon DE 103 06 888.0 filed Feb. 18, 2003 under the International Convention.

BACKGROUND OF THE INVENTION

1. Field of the Invention

The invention relates to coated powder material for producing three-dimensional bodies (3D bodies) by means of layer constituting methods (powder-based generative rapid prototyping processes), in particular by means of 3D binder printing, the production of 3D bodies therefrom, and the production and use of sintered bodies obtainable therefrom. Materials and methods of this type are known from DE 44 40 397 C2, DE 698 07 236 T2, DE 696 07 975 T2, DE 690 31 808 T2 and U.S. Pat. No. 6,335,097 B1.

2. Related Art of the Invention

Among the more recent and particularly interesting powder-based generative rapid prototyping (RP) processes is the 3D binder printing process.

In a first variant of 3D binder printing, a layer of particles or granules is discharged onto an underlying surface and moistened with a binding liquid in predetermined regions, which respectively correspond to a layer of an object to be generated. The particles are wetted and adhesively bonded by the binder liquid in the moistened regions. Subsequent evaporation of the solvents in the binder liquid has the effect that the particles adhere directly to one another, fusing together at least in their edge regions. 3D binder printing processes that are related in particular to this type are known for example from European patents EP 0 644 809 B1, EP 0 686 067 B1 and European patent application EP 1 099 534 A2.

In a further variant of this method, use is made of a binder liquid containing sintering aids which, when the moistened regions are dried, leaves behind sintering aids which make it possible for the particles to be sintered as a solid mass in a subsequent sintering treatment. Hard and compact sintered bodies can be obtained in this way.

EP 0 925 169 B1 discloses a further variant of the 3D binder printing process in which mixtures of particles, fillers and adhesives are used. The binder liquid is substantially formed just by a solvent for the adhesive contained in the mixture. The adhesive may in this case also be in the form of a coating of the particles.

A further process of generative rapid prototyping (RP) provides for the particles to be made to solidify in the layer by means of light, or laser-induced sintering (hereafter laser sintering). For this purpose, the layer is heated in defined regions by means of exposure to light, if appropriate also through a mask, or laser radiation to the extent that the particles can fuse together or sinter together.

The known generative RP binder printing processes have the disadvantage in the production of sintered bodies that the finished green compact or sintered body exhibits a distinct shrinkage in comparison with the region originally activated by means of binder liquid, light or laser light. This is attributable to effects during the activation and during the sintering, sintering being understood as meaning both the laser-induced processes during the hardening of the layer and the production of sintered bodies from the green compacts obtainable by the RP processes.

In binder printing, the particles move closer together when they are moistened, under the effect of the capillary forces and surface tension, in particular whenever adhesives that may be present are made to swell or dissolved by the binder liquid, so that a distinct shrinkage has taken place already during the shaping or after the drying to form the green compact. Shrinkage processes also occur in the case of exposure to light or laser sintering.

The effect of sintering, in particular with regard to the production of sintered bodies, can be divided into a number of stages. In the initial or early stage, the original particles are still visible. The first cohesion between the powder particles is created by bridge formation and grain growth. A slight shrinkage occurs. In the middle stage, the formation of a contiguous pore space takes place. The individual particles are no longer identifiable and the sintering shrinkage begins. In the late stage there is the reduction of the pore space, which becomes increasingly accessible from the outside (closed pores). In the limiting case, complete compaction takes place (dense sintering).

The main elements of the shrinkage are attributable to the middle stage.

The known coatings have the disadvantage that they are hydrophilic and therefore absorb water from the surroundings, in particular from the atmospheric moisture. This leads on the one hand to an agglomeration of the particles and on the other hand to a high binding liquid absorption in the case of 3D binder printing processes. This has a negative influence on the distinctness of image of the 3D binder printing process, the material shrinkage under exposure to the binder liquid, the storage stability, and also the handling of the powder.

SUMMARY OF THE INVENTION

The object of the invention is therefore to provide coated particles for powder-based generative rapid prototyping processes, in particular 3D binder printing, which exhibit improved storage stability and improved handling and allow a higher distinctness of image, and also to provide methods for producing bodies or sintered bodies from these particles with low shrinkage.

The object is achieved by coated powder material of plastic, metal or ceramic, the coating of which substantially comprises an adhesive and sinterable and/or glass-forming fine-grained material, and also methods for building up bodies from the coated powder material, in which the activation of the adhesive takes place either by means of a polar organic solvent, or by means of irradiation by light or laser light, and also a method for producing sintered bodies, the green compacts being sintered below the sintering or glass-forming temperature of the powder material and above that of the fine-grained material. An advantageous use of the sintered bodies is in foundry practice, mold making and the production of casting molds.

Preferred embodiments are the subject of the dependent claims.

A first aspect of the invention concerns the coating according to the invention of the powder material.

A first embodiment of the invention relates to a 3D binder printing process and particles that are particularly suitable for this. According to the invention, the adhesive comprises an adhesive which is solubilized, at least in part, or made to swell by a suitable binder liquid, so that adjacent particles of the powder material can be adhesively bonded to one another.

The thickness of the surface layer containing the adhesive in this case preferably lies in the range from 0.1 to 10% of the average diameter of the powder material. The preferred amount of adhesive lies in the range from 0.3 to 8% by weight of the respectively coated powder material.

The term powder material is to be understood as including both the individual particles or primary particles of plastic, metal or ceramic and aggregates or granules, which may in particular contain binding phases.

In a preferred refinement of the invention, the powder material is formed by granules of which the binding phase predominantly comprises the adhesive.

The adhesives that are suitable according to the invention include in particular organic or organo-metallic polymeric compounds with low hydrophilicity. They are preferably polymers containing polar groups with low water solubility which are soluble in organic solvents, such as for example alcohols, ketones or polyethers. In particular with regard to the setting of the desired solubilities, the use of polymer blends may be of advantage. The polymers that are suitable according to the invention include, inter alia, poly(meth)acrylates, polyvinyl alcohols, polyvinyl acetates, or polyvinyl pyrrolidones. In a particularly preferred embodiment of the invention, a polyvinyl butyral or mixtures thereof is used as the adhesive.

Among the organo-metallic polymers, polysilanes, polycarbosilanes or polysilazanes are of significance in particular.

In a further refinement of the invention, the adhesives are composed of substantially non-polar polymers, for example waxes. These adhesives are suitable in particular for metallic powder material.

The adhesives preferred according to the invention have the effect that on the surface of the powder material there is formed a water-insoluble to hydrophobic layer which no longer tends to absorb water from the surroundings, in particular the atmospheric moisture. This has the advantage that the coated particles are highly stable in storage and excellent in terms of handling. A further advantage lies in the improvement of the distinctness of image (accuracy, surface quality) of the binder print. Since the individual coated particles no longer tend to agglutinate under the influence of atmospheric moisture, no secondary agglomerates are formed. The minimum thickness of a material layer discharged in the 3D binder printing process is therefore that of the diameter of the particles of the powder material and not that of the diameter of secondary agglomerates that may be formed from them.

A further refinement of the invention relates to laser-induced sintering as a generative RP process and to particularly suited coatings.

As a difference from the 3D binder printing presented, the activation of the adhesive takes place here by laser irradiation. According to the invention, a polymeric coating which is made to sinter, or at least partially melt, by the thermal energy introduced is provided as the adhesive. In this case, polymers with a melting point below 150° C. are suitable in particular as the adhesive. If plastic is used as the polymer material, the melting or sintering temperature of the adhesive should be at least 20° C. below that of the particles of plastic.

A further refinement of the invention relates to a light-induced generative RP process, and to particularly suited coatings.

The activation of the adhesive takes place here by irradiation with light. Light-induced curing binders, such as for example (meth)acrylate-based. UV lacquers, are provided in this case as the adhesive. If appropriate, the moistening of the regions that are to be activated by means of a binder solution is of advantage.

A further aspect of the invention concerns the fine-grained material of sinterable and/or glass-forming microparticles contained in the coating.

BRIEF DESCRIPTION OF THE DRAWINGS

This aspect is explained in more detail on the basis of schematic drawings, in which.

DETAILED DESCRIPTION OF THE INVENTION

Figure 1:
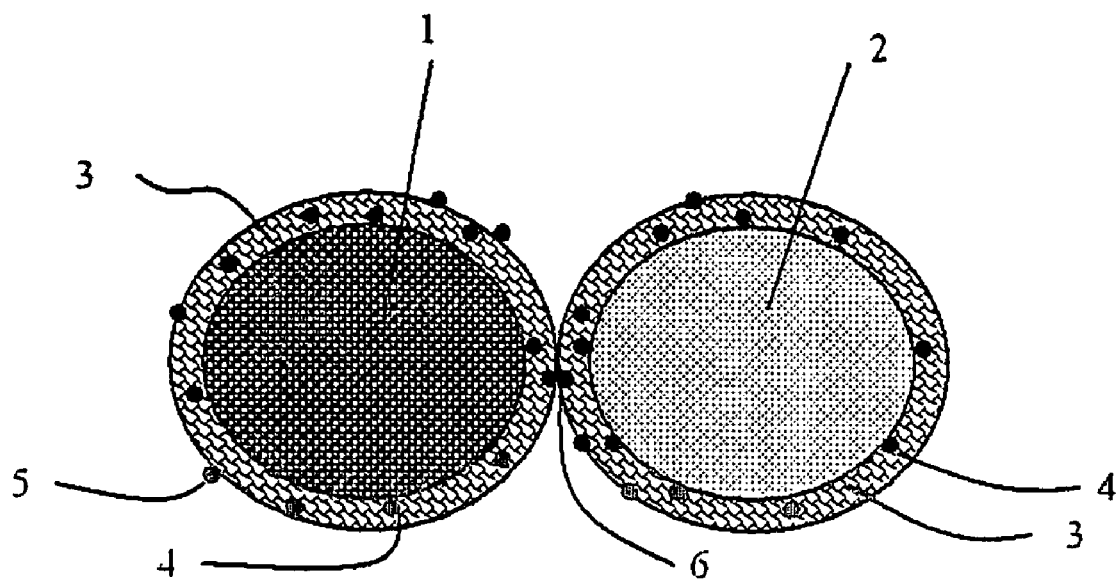
FIG. 1 shows two different particles with a coating of adhesive and fine-grained material.
Figure 2:
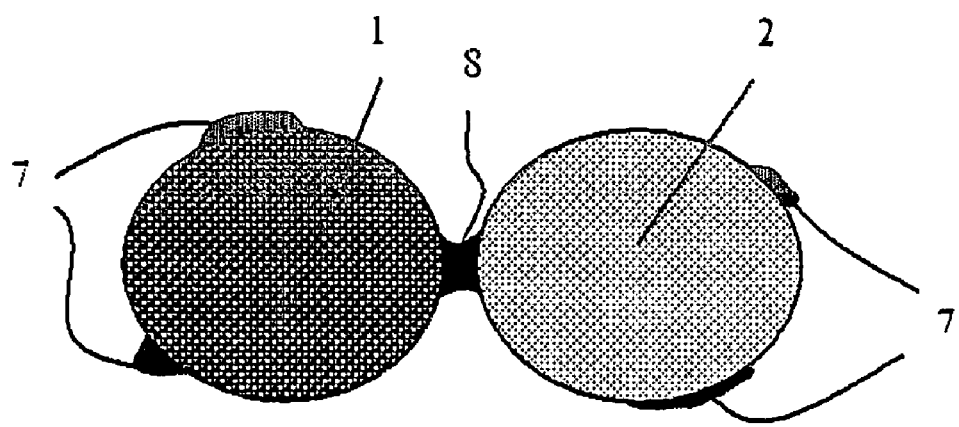
FIG. 2 shows two different particles, which are joined by a sintered bridge of fine-grained material.

For the purposes of the invention, a distinction is to be drawn here between the powder material comprising individual particles of a powder (2) or else aggregates (1) formed by agglomeration, in particular granules, which may be interspersed with non-powder binding phases, and the fine-grained material (4, 5, 6). The fine-grained material comprises individual particles of dimensions which lie distinctly below the dimensions of the powder material. The average particle sizes of the fine-grained material typically lie below 30% of the particle size of the powder material and preferably in the range from 0.3 to 5%. Particularly preferably, the fine-grained material comprises submicron particles or nanoparticles. The fine-grained material (4) in this case lies at least partly within the coating formed by the adhesive (3). Particles (5) protruding from the coating are also preferably covered by adhesive.

The fine-grained material is composed of sinterable and/or glass-forming material which is suitable for forming a solid sintering or glass phase in later thermal treatment of the body (or green compact) formed by the 3D binder printing process.

The arrangement according to the invention of the fine-grained particles on the surface of the individual powder particles leads to sintered or glass bridges (8) being formed between adjacent powder particles (1, 2) in this thermal treatment. As a result, a solidification of the green compact takes place, or the formation of a solid sintered body. The shrinkage hereby taking place is minimal, since it is restricted to the small fine-grained particles (7). The fine-grained particles (6) lying against the contact surfaces have the effect that the liberation of binder from the bodies also cannot lead to any appreciable shrinkage, as would have to be expected by the removal of the adhesive.

If this thermal treatment is performed below the glass-forming or sintering temperature of the powder material, virtually no sintering shrinkage of the complete body or green compact occurs.

Therefore, powder material and finest-grained material are preferably selected such that the fine-grained particles have a lower sintering or glass-forming temperature than the powder material. This temperature difference preferably lies above 30° C. and particularly preferably above 100° C.

In principle, it is the case with material of the same type that, on account of their greater surface energy, the smaller particles have a lower sintering temperature or glass-forming temperature than the larger ones. This effect is very clear in particular in the case of the preferred fine-grained particles in the submicrometer or nano range. Therefore, the material combinations preferred according to the invention comprise both different and identical chemical compounds.

In the same way as in the case of the powder material, the fine-grained material may be plastic, metals or ceramic. In this respect, materials that are chemically compatible are preferred, since as a result the fine-grained material can form sintered or glass bridges which adhere particularly firmly. Usually, the material of the fine-grained particles comprises the sintering aids that are customary for the respective powder material.

In the case of ceramic powder material, the fine-grained material is preferably selected from the group of oxides, nitrides or carbides of the elements B, Si, Ti, Al and/or Zr. Particularly preferred are $SiO_2$, silicates, borosilicates or alumosilicates, in particular in combination with powder material of oxide ceramic.

In a particularly preferred refinement of the invention, the powder material is substantially formed by $ZrSiO_4$, $ZrO_2$ and/or $Al_2O_3$ and the fine-grained material is substantially formed by $SiO_2$, in particular $SiO_2$ nanopowder.

In a further preferred refinement, powder material and fine-grained material are substantially formed by SiC. In this case, adhesives based on organo-silicon polymers are preferred.

In the case of metallic powder material, the fine-grained material is preferably formed from metals or alloys of the elements Cu, Sn, Zn, Al, Bi, Fe and/or Pb.

For metallic powder material, metal salts, which can be thermally decomposed to form the corresponding metals, are similarly also suitable as fine-grained material.

The production of the coating may take place by the customary coating methods for powder particles. The coating is preferably applied in a fluidized bed reactor or a spray dryer.

In the fluidized bed reactor, the feeding of the adhesive takes place by spraying in or injecting a solution in a suitable solvent. The feeding of the fine-grained material takes place for example by means of spraying in or injecting suitable suspensions or colloidal solutions. Similarly, however, fine-grained material may also be added in a metered manner as a solid substance in the same way as the powder material.

Depending on the residence time of the powder material in the coating device, the powder particles can be coated individually, or be built up into granules by means of adhesive as the binder phase. The layer thickness of the applied adhesive can be set, for example, by means of the concentration of the adhesive in the sprayed-in solution, the residence time and the temperature in the reactor, or spray dryer.

In an alternative way, the fine-grained material may also only be applied to the powder particles once they have been coated with adhesive. This then preferably takes place by mechanical mixing, for example in a hybridizer. The harder fine-grained material is thereby mechanically worked into the softer coating by a mixing operation.

This method allows both coated primary particles and coated granules to be produced. In particular, it is also possible to obtain granules bonded with adhesive from particles of the powder material and the fine-grained material.

A further aspect of the invention concerns a method for producing a body from the powder material coated according to the invention. Here, the powder material is initially discharged as a thin layer of powder. The methods customary in 3D binder printing technology can be used here in particular. The low water absorption of the powders coated according to the invention has the effect that distinct advantages occur in this method step with regard to uniformity of the layer of powder and in handling the powder. The layer of powder is preferably only a few powder layers thick, and with particular preference comprises only a powder monolayer. The preferred layer thickness lies in the range from 10 to 50 μm.

In the 3D binder printing process, the layer of powder is then wetted in defined regions with a binder liquid, which activates the adhesive of the coating. High-resolution ink-jet print heads for ink-jet printers are preferably used as binder liquid nozzles.

The binder liquid according to the invention is substantially formed by organic solvents or their mixtures. These are preferably polar solvents, the mixtures preferably having a water content below 45% by weight and particularly preferably below 5% by weight. The chemical composition of the binder liquid is chosen such that the polymeric products of the coating are soluble, or at least swellable, in it. The preferred solvents include C2 to C7 alcohols, in particular ethyl alcohol, (iso)propanol or n-butanol, C3 to C8 ketones, such as for example acetone or ethyl-methyl ketone, cyclic ethers, such as tetrahydrofuran, or polyethers, such as dimethoxyethanol or dimethoxydiethylene glycol.

In the case of the use of wax-like adhesives, low-molecular-weight aliphatic hydrocarbons, in particular cyclic or linear C6 to C8 aliphatics, are preferred.

The binder liquid is preferably virtually free from solid or insoluble constituents. The upper limit is preferably 5% by weight. The low content or the complete absence of solid substances in the binder liquid provides distinct advantages for the reliability and durability of the binder nozzles. Abrasion and clogging of the print heads no longer occur in principle with the binder liquids according to the invention.

The wetting of the coated particles has the effect that the adhesive is solubilized or made to swell, at least in the edge region of the coating. In both cases, an adhesive phase forms from the particles adjacent at the area of contact brings about adhesive bonding.

According to the invention, the amount of binder liquid is chosen such that it is not sufficient to dissolve all the adhesive that is bonded in the coating. Rather, the amount of binder liquid is metered such that it is only sufficient to dissolve or solubilize at the points of contact of adjacent particles. The enrichment of the binder liquids at these contact zones is assisted by the effects of capillary action. The amount of binder liquid used for moistening the powder preferably lies in the range from 5 to 70% by volume of the volume of powder to be coated. Particularly preferably, the amount of binder liquid is 5 to 25 times the volume of the adhesive that is present in the coating.

Vaporization which then follows allows the adhesive to take effect. In this case, the use of organic solvents proves to be a further advantage over aqueous binder liquids. On account of the higher vapor pressure of the organic solvents, the moistened locations dry much more quickly. This has positive effects on the distinctness of image and the speed of the process.

The process steps of applying the powder material and moistening are repeated in the known way to build up a 3D body. On account of the minimal swelling and shrinking processes, even comparatively large bodies can be produced virtually free from stress. The powder material according to the invention and the process according to the invention allow the material shrinkage to be lowered below 2%.

In the case of laser-induced sintering, the activation of the adhesive takes place by sintering or melting by means of laser radiation. In this case, the energy introduced is metered such that it is not sufficient to melt or sinter the primary particles. The polymer used as adhesive preferably has in this case a melting or sintering temperature in the range from 50 to 250° C.

A further aspect of the invention concerns the production of sintered bodies with lowest possible sintering shrinkage. In this case, green compacts that can be obtained by means of the 3D binder printing process described and by using the coated powder particles according to the invention are taken as a basis.

According to the invention, the green compacts are fired at a temperature below the sintering temperature or glass transition temperature of the powder material and above that of the fine-grained material contained in the coating. The sintering temperature is to be understood here as meaning the temperature of the middle sintering stage, in which the formation of a contiguous pore space takes place, the individual particles are no longer identifiable and the sintering shrinkage begins. The firing temperature of the green compacts preferably lies at least 30° C. below the sintering or glass-forming temperature of the powder material. As a result, the shrinkage caused by sintering and/or glass formation is restricted substantially to the fine-grained material. The volume effects caused as a result are minimal, in comparison with the overall volume of the green compact or sintered body. It is therefore possible to produce solid sintered bodies which have a linear shrinkage of at most 2% in comparison with the dimensions predetermined in the 3D binder printing process.

The plastic, ceramic or metal bodies which can be obtained as a result have a high porosity in comparison with densely sintered materials. The porosity in this case typically lies in the range from 40 to 60% by volume.

Depending on the intended use, the sintered bodies may be redensified or resintered, in order to lower the porosity.

An application preferred according to the invention for the green compacts or sintered bodies obtained by means of ceramic powder material is in foundry practice and mold making. For example, $Al_2O_3$ or $ZrSiO_4$ ceramic bonded by $SiO_2$ fine-grained material is suitable as molds or inserts in the precision casting of metals.

In particular on account of their high porosity and good thermal conductivity, the metallic bodies according to the invention are suitable for example for applications in heat exchangers or catalytic converters. By resintering or suitable redensification, subminiature components and microcomponents can be produced for a wide variety of precision engineering applications.

The plastic bodies according to the invention are suitable in particular as specimen molds.

They are also suitable for use in tool making.

The invention claimed is:

1. A coated powder material for a two step generative rapid prototyping processes involving a first step of forming a green compact followed by a second step of sintering, the powder material comprising:
   individual core particles or granules,
   wherein the individual core particles or granules are respectively coated, the coating containing an activatable adhesive,
   wherein the coating additionally contains sinterable and/or glass-forming fine-grained spacer material,
   wherein the activatable adhesive is activatable in the first step of forming the green compact without changing the physical properties of the individual core particle or granule or the fine grained spacer material,
   wherein the average particle size of the fine-grained material lies below 30% of the particle size of the core particles, and
   wherein the size and/or composition of the sinterable and/or glass-forming fine-grained spacer material is such that upon sintering the fine grained spacer material sinters earlier than the individual core particles or granules.

2. The coated powder material as claimed in claim 1, wherein the sintering temperature and/or the glass transition temperature of the fine-grained material lies below the sintering temperature or glass transition temperature of the powder material.

3. The coated powder material as claimed in claim 1, wherein the fine-grained material comprises at least one oxide, carbide or nitride of the elements Si, B, Ti or Al.

4. The coated powder material as claimed in claim 3, wherein the fine-grained material contains silicates, borosilicates or alumosilicates.

5. The coated powder material as claimed in claim 1, wherein the fine-grained material comprises at least one metal or metal salt.

6. The coated powder material as claimed in claim 1, wherein the fine-grained material is formed by nanoparticles and/or microparticles with an average grain size below 5 μm.

7. The coated powder material as claimed in claim 1, wherein the sintering temperature and/or glass transition temperature of the fine-grained material is at least 30° C. below the sintering temperature and/or glass transition temperature of the powder material.

8. The coated powder material as claimed in claim 1, wherein the adhesive comprises an adhesive which is soluble in a binder liquid.

9. The coated powder material as claimed in claim 8, wherein the adhesive is composed of organic or organo-metallic polymers of low water solubility.

10. The coated powder material as claimed in claim 9, wherein the adhesive is swellable or soluble in a binder liquid of organic solvents with a water content below 45%.

11. The coated powder material as claimed in claim 1, wherein the adhesive comprises a polymer which has a melting or sintering temperature in the range from 50 to 250° C.

12. The coated powder material as claimed in claim 1, wherein the adhesive comprises a light-curing binder.

13. A generative rapid prototyping process for producing a body from a powder material, comprising the steps of
   discharging a layer of powder on an underlying surface,
   moistening defined regions of the layer with a binder liquid for the activation of a binder,
   selecting the binder liquid from organic solvents and having a water content below 45%,
   wherein the powder material comprises individual core particles or granules, wherein the individual core particles or granules are respectively coated, the coating containing an activatable adhesive, the coating additionally containing sinterable and/or glass-forming fine-grained material, wherein the average particle size of the fine-grained material lies below 30% of the particle size of the core particles, and wherein said fine grained material lying against the contact surfaces of the individual particles or granules inhibits shrinkage of the body upon activation of the binder, and wherein the adhesive:
   (a) comprises an adhesive which is soluble in a binder liquid,
   (b) is composed of organic or organo-metallic polymers of low water solubility, and/or
   (c) is swellable or soluble in a binder liquid of organic solvents with a water content below 45%.

14. The method as claimed in claim 13, wherein the proportion of insoluble constituents in the binder liquid lies below 5% by weight.

15. The method as claimed in claim 13, wherein the amount of binder liquid used for moistening the powder lies in the range from 5 to 70% by volume of the powder volume to be coated.

16. A generative rapid prototyping process for producing a body from a powder material coated with an adhesive, comprising the steps of:
- discharging a layer of powder on an underlying surface,
- irradiating defined regions of the layer of powder with laser light,
- melting or sintering the adhesive, at least of the discharged layer of powder, by the laser irradiation,
- the energy of the laser light being insufficient to melt or sinter the powder material, wherein the powder material comprises individual core particles or granules, wherein the individual core particles or granules are respectively coated, the coating containing an activatable adhesive comprising a polymer which has a melting or sintering temperature in the range from 50 to 250° C., and wherein the coating additionally contains sinterable and/or glass-forming fine-grained material, wherein the average particle size of the fine-grained material lies below 30% of the particle size of the core particles, and wherein said fine grained material lying against the contact surfaces of the individual particles or granules inhibits shrinkage of the body upon melting or sintering of the adhesive.

17. A method for producing a sintered body from a powder material by a rapid prototyping process followed by sintering, wherein the rapid prototyping process comprises:
- discharging a layer of powder on an underlying surface,
- selecting the binder liquid from organic solvents and having a water content below 45%,
- moistening defined regions of the layer with a binder liquid for the activation of a binder,
- wherein the powder material comprises individual core particles or granules, wherein the individual core particles or granules are respectively coated, the coating containing an activatable adhesive, the coating additionally containing sinterable and/or glass-forming fine-grained spacer material, wherein the average particle size of the fine-grained material lies below 30% of the particle size of the core particles, such that the fine grained spacer material lies against the contact surfaces of the core particles or granules to minimize shrinkage upon liquification or removal of adhesive, and wherein the adhesive:
  - (a) comprises an adhesive which is soluble in the binder liquid,
  - (b) is composed of organic or organo-metallic polymers of low water solubility, and/or
  - (c) is swellable or soluble in the binder liquid of organic solvents with a water content below 45%, and
- wherein the sintering process comprises:
  - sintering the green compact produced by means of the rapid prototyping process for a time and temperature sufficient to liberate the coating and to sinter the fine grained spacer material contained in the coating, yet below the sintering or glass transition time and temperature of the core particles or granules.

18. The method for producing a sintered body as claimed in claim 17, wherein the sintered body is used in foundry practice or in mold making.

19. The method for producing a sintered body as claimed in claim 17, wherein the sintered body is used in precision engineering or in tool making.

20. The coated powder material as claimed in claim 1, wherein the particle diameter of the fine particles is from 0.3 to 5% of the particle diameter of the powder particles or granules.

\* \* \* \* \*